United States Patent
O'Connor et al.

(10) Patent No.: US 12,358,516 B1
(45) Date of Patent: Jul. 15, 2025

(54) CONTROL SYSTEM FOR NAVIGATING DURING A DETECTED EVENT

(71) Applicant: Apple Inc., Cupertino, CA (US)

(72) Inventors: Ian E. O'Connor, Campbell, CA (US); Anton Uselmann, Stuttgart (DE); Scott Kenyon, South Lyon, MI (US)

(73) Assignee: Apple Inc., Cupertino, CA (US)

(*) Notice: Subject to any disclaimer, the term of this patent is extended or adjusted under 35 U.S.C. 154(b) by 107 days.

(21) Appl. No.: 17/950,002

(22) Filed: Sep. 21, 2022

(51) Int. Cl.
| | | |
|---|---|---|
| *B60W 10/00* | (2006.01) | |
| *B60W 10/08* | (2006.01) | |
| *B60W 10/20* | (2006.01) | |
| *B60W 50/02* | (2012.01) | |
| *B60W 50/14* | (2020.01) | |
| *B62D 7/15* | (2006.01) | |

(52) U.S. Cl.
CPC ........ *B60W 50/0225* (2013.01); *B60W 10/08* (2013.01); *B60W 10/20* (2013.01); *B60W 50/14* (2013.01); *B62D 7/159* (2013.01); *B60W 2510/20* (2013.01); *B60W 2520/06* (2013.01); *B60W 2552/05* (2020.02); *B60W 2554/802* (2020.02); *B60W 2710/083* (2013.01); *B60W 2710/20* (2013.01)

(58) Field of Classification Search
None
See application file for complete search history.

(56) References Cited

U.S. PATENT DOCUMENTS

| | | | | |
|---|---|---|---|---|
| 4,936,401 A | * | 6/1990 | Baraszu | B62D 7/159 |
| | | | | 180/421 |
| 5,586,031 A | * | 12/1996 | Fussl | B62D 7/142 |
| | | | | 180/413 |
| 6,488,113 B1 | * | 12/2002 | Worpell | B62D 7/148 |
| | | | | 701/41 |
| 10,262,538 B1 | | 4/2019 | Milovich | |
| 11,939,010 B2 | * | 3/2024 | Pramod | B62D 5/0487 |
| 2015/0019063 A1 | | 1/2015 | Lu | |
| 2016/0037706 A1 | * | 2/2016 | Bebernes | B62D 6/10 |
| | | | | 180/403 |
| 2016/0090100 A1 | * | 3/2016 | Oyama | B62D 15/025 |
| | | | | 701/23 |
| 2018/0052463 A1 | | 2/2018 | Mays | |

(Continued)

FOREIGN PATENT DOCUMENTS

CN 111913492 A 11/2020

*Primary Examiner* — James M McPherson
(74) *Attorney, Agent, or Firm* — BAKERHOSTETLER

(57) ABSTRACT

A vehicle control system for a vehicle can obtain detected event information of a front steering system and use a rear steering system to maneuver the vehicle. The vehicle control system can obtain fault information and determine, based on the fault information, a new destination (different from the originally-intended destination), and maneuver the vehicle to the new destination. This may include rotating the vehicle and subsequently instructing the rear steering system to maneuver the vehicle to a safe destination. The vehicle may include fully autonomous or semi-autonomous capabilities, and accordingly, the vehicle control system can use the rear steering system to maneuver the vehicle to the alternate destination with little or no passenger input. Other components, including a drivetrain system, a braking system, and a suspension system, can also be used to maneuver the vehicle to the new destination.

20 Claims, 12 Drawing Sheets

(56) References Cited

U.S. PATENT DOCUMENTS

| | | |
|---|---|---|
| 2018/0201310 A1* | 7/2018 | Rotole .................... B62D 5/06 |
| 2018/0345971 A1 | 12/2018 | Birnschein |
| 2019/0154453 A1 | 5/2019 | Leone |
| 2020/0387163 A1 | 12/2020 | Bhowmick |
| 2021/0078633 A1* | 3/2021 | Hudson ................. B62D 49/06 |
| 2021/0370989 A1 | 12/2021 | Morimura |
| 2021/0373569 A1 | 12/2021 | Tazume |
| 2022/0063645 A1 | 3/2022 | Barecke |
| 2022/0080838 A1* | 3/2022 | Hwang ............... B60W 40/101 |
| 2022/0111846 A1 | 4/2022 | Hashimoto |
| 2022/0348219 A1* | 11/2022 | Kim ...................... B62D 9/005 |
| 2023/0406295 A1* | 12/2023 | Jang ....................... G06V 10/82 |
| 2024/0308290 A1* | 9/2024 | Sieve .................. B60G 17/018 |

* cited by examiner

CONTROL SYSTEM FOR NAVIGATING DURING A DETECTED EVENT

TECHNICAL FIELD

This application is directed to control systems, and more particularly, to a control system designed to operate a rear steering system when an event is detected at a front steering system.

BACKGROUND

Vehicles, including motorized vehicles, include several components used to enhance the overall safety of the vehicle. For example, steering systems often include multiple motors used to control steering aspects of a front steering system of the vehicle. Additionally, some vehicles include multiple inverters and controllers (i.e., one controller for each inverter), with the inverters and controllers controlling a dual wound motor used to steer the vehicle in a redundant manner. Also, vehicles often include multiple electronic control units to receive an input from position sensors, which assists the steering efforts by, for example, providing feedback. As a result of using multiple, redundant components at the front end of the vehicle, the vehicle can operate reliably if, for example, an inverter-controller pair fails. Further, using multiple hardware components at the front steering system allows vehicle manufacturers to attain high safety ratings.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
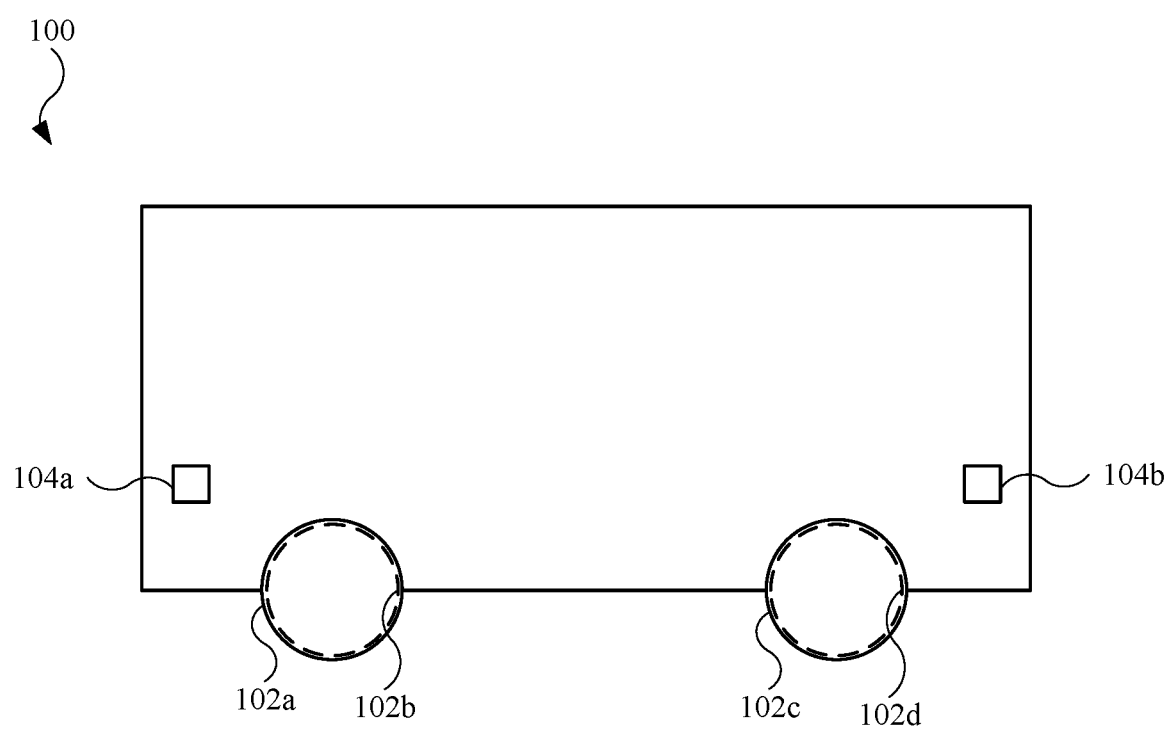
FIG. 1 illustrates a perspective view of a system, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology of this application is directed to navigation of a vehicle when an event to the vehicle is detected. In particular, the subject technology is directed to a control system used to maneuver a vehicle using one or more features associated with a rear section of the vehicle when data indicating a fault at a front section of the vehicle is obtained. The fault may include an issue related to one or more features (e.g., hardware and/or software) of a front steering system of the front section. The vehicle control system is designed to mitigate hazardous or dangerous situations and maneuver the vehicle to a "safe harbor" destination. This may include maneuvering the vehicle off the road to a shoulder, to an off-ramp, to a side street (e.g., a street with slower-moving traffic), to a vehicle repair facility, or to a medical facility, as non-limiting examples.

In an exemplary embodiment, a vehicle traveling on a roadway uses a front steering system to direct wheels of the front steering system (thus providing a direction of travel of the vehicle) while a motor, or motors, can provide torque to rotationally drive the wheels, including front and rear wheels of the vehicle. When a vehicle control system obtains a detected event indicating one or more features of the front steering system is inoperable for steering the vehicle to a desired destination, the vehicle control system can rotate the vehicle, using a rear steering system, such that the rear steering system compensates for the front steering system detected event, effectively becoming the "front" steering system capable of maneuvering the vehicle. A rotation of the vehicle may include a 180-degree rotation, or an approximately 180-degree rotation, of the vehicle. Based on the extent or degree of the detected event at the front steering system, the vehicle control system can use the rear steering system to determine a safe destination and maneuver the vehicle to the safe destination.

In addition to the rear steering system, the vehicle control system can control other components when an event, such as a fault, is detected. For example, the vehicle control system can provide instructions to a braking system to operate the brakes to maneuver (e.g., rotate and/or steer) the vehicle. Additionally, the vehicle control system can provide instructions to a drivetrain system to operate to adjust the power distribution to the wheels. Further, the vehicle control system can provide instructions to a suspension system to apply more less force to the wheels. The vehicle control system can instruct these systems, alone or in combination, and can use these systems to separately and individually control the wheels.

Additionally, vehicle control systems described herein provide autonomous driving capabilities, including fully autonomous or semi-autonomous driving capabilities, that can guide the vehicle to a selected safe destination. In this regard, a vehicle control system that provides fully autonomous driving capabilities can maneuver the vehicle using the front steering system during a normal operating mode and can subsequently maneuver the vehicle using the rear steering when an event is detected to the front steering system, all without human input (i.e., no controls, commands, or inputs by a passenger). Conversely, a vehicle control system that provides semi-autonomous driving capabilities can, for example, allow human input (e.g., driver) to maneuver the vehicle using the front steering system during a normal operating mode and when an event is detected to the front steering system, and subsequently maneuver the vehicle using the rear steering system without human input.

Steering systems controlled by vehicle control systems described herein offer several advantages over traditional steering systems. For example, a front steering system with steer-by-wire technology often includes multiple, independent controller-inverter pairs used to control a dual wound motor used to turn/rotate the front wheels. These and other components used in steer-by-wire for redundancy or fault tolerance add to the overall cost and complexity of steering. Beneficially, vehicles described herein may use the vehicle control system to control a single controller-inverter to turn the front wheels connected to the front steering system and single controller-inverter to turn the rear wheels connected to the rear steering system, thus providing a fault-tolerant system with less complexity than the dual wound motor in steer-by-wire systems.

In order to maneuver the vehicle, each wheel be independently operated, including individually driven by torque and individually slowed/stopped by a braking torque. Additionally, the front wheels connected to the front steering system can be operated/rotated independently of the rear wheels connected to the rear steering system. As a result, the fault tolerance of the front steering system can be removed, while compensating for the failure through independent wheel torque control of the braking system, independent axle torque control of the drivetrain system, and rear wheel angle of the rear steering system. This enables the vehicle to continue driving to a safe destination following failure of the front steering system, execute all required high-speed dynamic maneuvering, and avoid hazards.

These and other embodiments are discussed below with reference to FIGS. 1-15. However, those skilled in the art will readily appreciate that the detailed description given herein with respect to these Figures is for explanatory purposes only and should not be construed as limiting.

According to some embodiments, for example as shown in FIG. 1, a system 100 is shown. The system 100, as well as other systems shown and/or described herein, can take the form of a motorized vehicle. Accordingly, the system 100 may take the form of a sedan, a sport-utility vehicle (SUV), or a pickup truck, as non-limiting examples. Also, while a discrete number of doors is shown, the number of doors of the system 100 may vary.

The system 100 may include one or more motors (not shown in FIG. 1) designed to provide torque to and rotationally drive a wheel 102a and a wheel 102b (shown as a dotted line) associated with a front section of the system 100, as well as provide torque to and rotationally drive a wheel 102c and a wheel 102d (shown as a dotted line) associated with a rear section of the system 100. The one or more motors may include an internal combustion engine, one or more electric motors, or a combination thereof. Accordingly, the system 100 may include a tank to fuel the internal combustion engine, if present in the system 100, and/or a battery to provide electrical energy to the electric motor(s) if present in the system 100.

Additionally, the system 100 may take the form of a semi-autonomous vehicle that can be operated with some human input or assistance. In this regard, the system 100 may include steering-based inputs for a driver to operate the wheels 102a and 102b. Additionally, the system 100 may include multiple sensing devices. For example, the system 100 includes a sensing device 104a and a sensing device 104b (representative of additional sensing devices). The sensing devices 104a and 104b may take various forms of sensing devices, such as an image sensing device (e.g., camera), a radar system, a lidar system, or a combination thereof. Alternatively, the system 100 may take the form of a fully autonomous vehicle that can be operated without human input or assistance, and the sensing devices 104a and 104b provide various inputs to guide the system 100.

Figure 2:
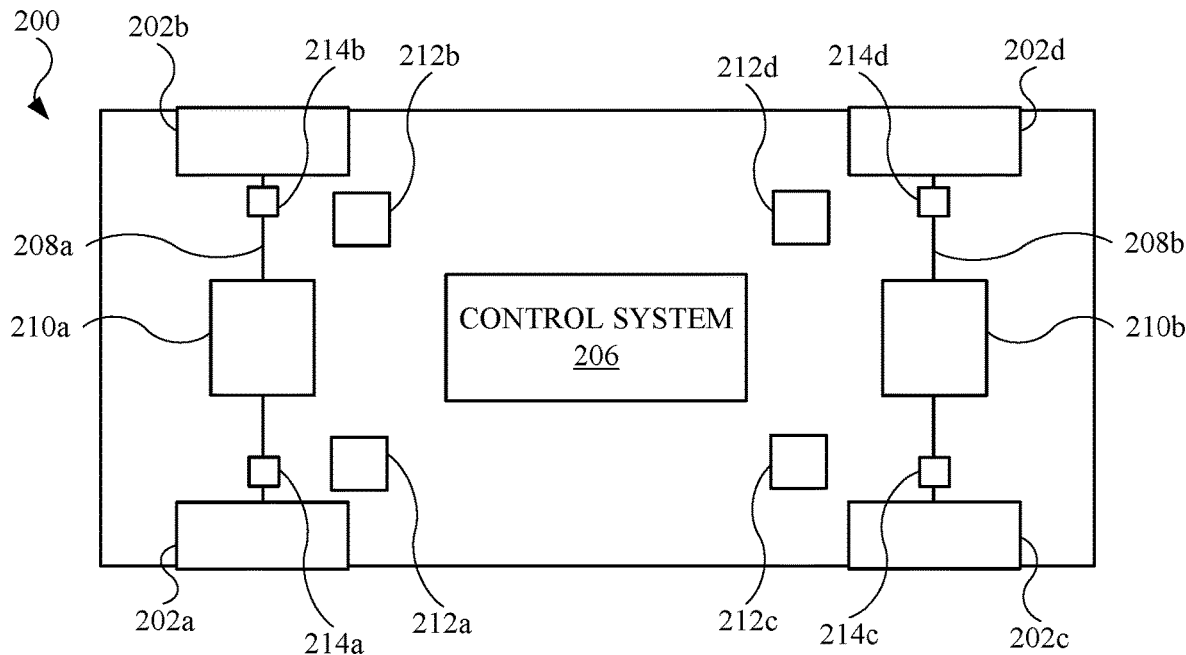
FIG. 2 illustrates a bottom view of a system with a dual motor configuration, in accordance with aspects of the present disclosure.

Referring to FIG. 2, a system 200 includes a control system 206 designed to communicate and provide instructions to various components and features of the system 200. The control system 206 may be integrated with a vehicle and provide instructions and commands for the vehicle. For example, the system 200 includes a front steering system 208a connected to a wheel 202a and a wheel 202b, as well as a rear steering system 208b connected to a wheel 202c and a wheel 202d.

Additionally, the system 200 includes a front motor assembly 210a and a rear motor assembly 210b. The system 200 may be referred to a dual motor system. For example, the front motor assembly 210a is designed to provide torque to the wheels 202a and 202b, and the rear motor assembly 210b is designed to provide torque to the wheels 202c and 202d. Additionally, the front motor assembly 210a and the rear motor assembly 210b includes a front steering motor and a rear steering motor, respectively. The control system 206 can provide instructions to the front motor assembly 210a to steer (e.g., rotate or turn) the wheels 202a and 202b, and to drive the system 200, respectively. Similarly, the control system 206 can provide instructions to the rear motor assembly 210b to steer the wheels 202c and 202d, and to drive the system 200. Based on its capabilities, the system 200 may operate as a front-wheel drive (FWD) vehicle, all-wheel drive (AWD) vehicle, four-wheel drive (4WD) vehicle, or a real-wheel drive (RWD) vehicle.

During a normal operating mode, the control system 206 can use the front motor assembly 210a operate and steer the wheels 202a and 202b. When the control system 206 obtains vehicle data related to a detected event (e.g., fault at the front steering system 208a and/or at the front motor assembly 210a), the control system 206 can provide instructions to the rear steering system 208b and to the rear motor assembly 210b to steer the wheels 202c and 202d, and rotate the system 200 by approximately 180 degrees, for example, and subsequently continue driving the system 200 to a selected destination using the rear steering system 208b and the rear motor assembly 210b. Further, the control system 206 can use the rear steering system 208b to rotate the wheels at different rotational speeds, allowing the system 200 to readily perform the rotation.

The system 200 includes a brake 212a, a brake 212b, a brake 212c, and a brake 212d designed to provide a braking torque to the wheel 202a, the wheel 202b, the wheel 202c, and the wheel 202d, respectively. Each of the brakes 212a, 212b, 212c, and 212d may include electronic calipers or hydraulic calipers, as non-limiting examples. Also, the brakes 212a, 212b, 212c, and 212d are part of a braking system that can receive and carry out instructions from the control system 206. In a normal operating mode, the control system 206 can provide braking instructions to any one or more of the brakes 212a, 212b, 212c, and 212d to decelerate the system 200.

However, when the control system 206 obtains vehicle data related to a detected event, the control system 206 can provide braking instructions to any one or more of the brakes 212a, 212b, 212c, and 212d. Further, the control system 206 can provide acceleration instructions to at least one of the front motor assembly 210a and the rear motor assembly 210b to drive at least one of the wheels 202a, 202b, 202c, and 202d. Still further, the control system 206 can provide steering instructions to at least one of the front motor assembly 210a and the rear motor assembly 210b to rotate the wheels 202a, 202b, 202c, and 202d. For example, when an event is detected, the control system 206 can provide i) braking instructions to the brakes 212a and 212b to stop the wheels 202a and 202b, respectively, ii) steering instructions to the rear steering system 208b to rotate the wheels 202c and 202d at an angle, iii) acceleration instructions to rotationally drive the wheels 202c and 202d to rotate the system 200 by 180 degrees (based on the angle), iv) additional steering instructions to the rear steering system 208b that provide turn-by-turn instructions to a selected destination, and v) additional acceleration instructions to rotationally drive the wheels 202c and 202d to propel the system 200 to the selected destination. Also, any one or more of the brakes 212a, 212b, 212c, and 212d can be used to further steer the system 200 to the selected destination. For purposes of safety, prior to maneuvering a 180-degree turn of the system 200, any one or more of the brakes 212a, 212b, 212c, and 212d can be used to slow the system 200 to a safe speed (e.g., 5-10 miles per hours) or bring the system 200 to a complete stop.

Additionally, the system 200 includes a suspension assembly 214a, a suspension assembly 214b, a suspension assembly 214c, and a suspension assembly 214d designed to enhance and stabilize movement at the wheel 202a, the wheel 202b, the wheel 202c, and the wheel 202d, respectively. Each of the suspension assemblies 214a, 214b, 214c, and 214d may include a shock and a strut, as non-limiting examples. Also, the suspension assemblies 214a, 214b, 214c, and 214d are part of a suspension system, including an electronic suspension system that can receive and carry out instructions from the control system 206. For example, the control system 206 can modify any one or more of the suspension assembly 214a, a suspension assembly 214b, a suspension assembly 214c, and a suspension assembly 214d to provide more or less force to the wheel 202a, the wheel 202b, the wheel 202c, and the wheel 202d, respectively, to complete the 180-degree rotation. Moreover, the control system 206 can use the suspension assemblies 214a, 214b, 214c, and 214d in conjunction with the brakes 212a, 212b, 212c, and 212d, as well as the rear motor assembly 210b, to maneuver the system 200 to the selected destination.

Also, in some embodiments, when the detected event is obtained, the control system 206 may use any remaining components associated with the front steering system 208a to maneuver the system 200 provided the detected event information does not indicate the component is malfunctioning or in an inoperable state. For example, when a detected event occurs indicating the front steering system 208a is malfunctioning but does not otherwise indicate the brakes 212a and 212b are malfunctioning, the control system 206 may rely on the brakes 212a and 212b to continue maneuvering the system 200.

Figure 3:
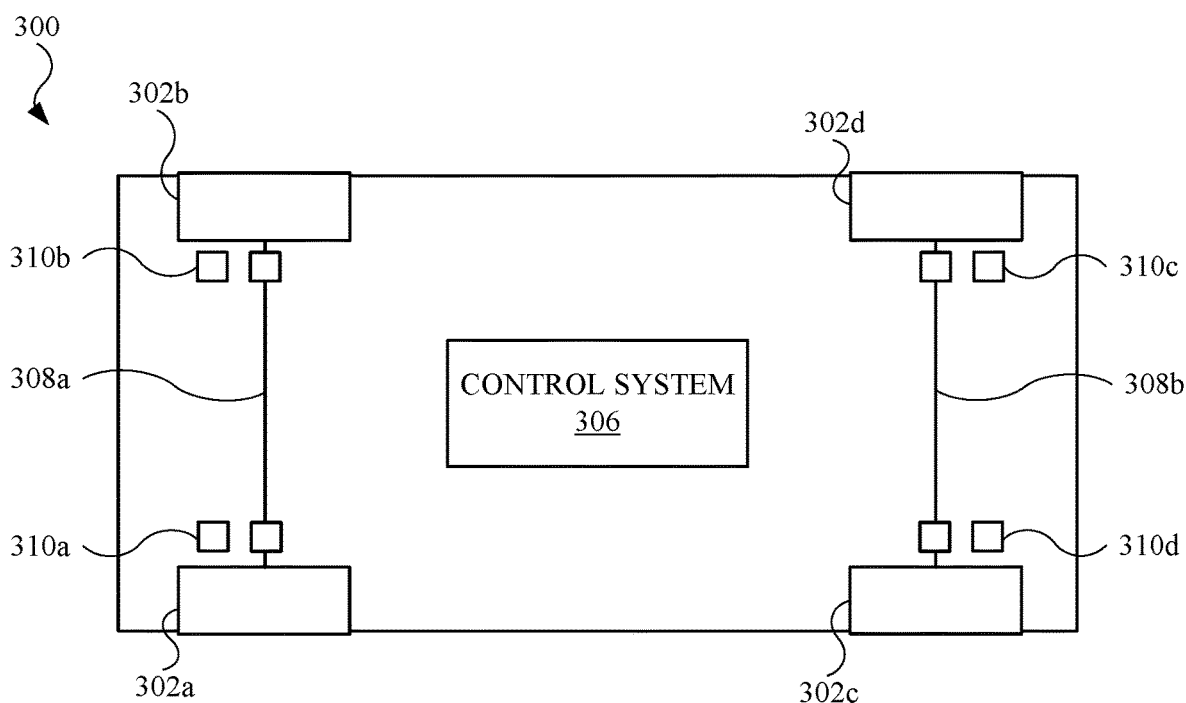
FIG. 3 illustrates a bottom view of a system with an in-wheel motor at each wheel, in accordance with aspects of the present disclosure.

Referring to FIG. 3, a system 300 includes a vehicle control system 306 designed to communicate and provide instructions to various components and features of the system 300, such as a front steering system 308a connected to a wheel 302a and a wheel 302b, and a rear steering system 308b connected to a wheel 302c and a wheel 302d. The system 300 may maneuver in any manner described for the system 200 in FIG. 2, and may include several features shown and described for the system 200 in FIG. 2. However, the number of motors differ. For example, the system 300 includes a motor assembly 310a and a motor assembly 310b (i.e., front motor assemblies) to provide torque and steering to the wheel 302a and the wheel 302b, respectively. Also, the system 300 includes a motor assembly 310c and a motor assembly 310d (i.e., rear motor assemblies) to provide torque and steering to the wheel 302d and the wheel 302d, respectively. The motor assemblies 310a, 310b, 310c and 310d may be referred to as in-wheel motors, and may provide torque, individually and separately, to the wheels 302a, 302b, 302c, and 302d, respectively. Accordingly, the vehicle control system 306 can provide instructions to operate any one or more of the motor assemblies 310a, 310b, 310c and 310d. In this regard, the system 300 may operate as a FWD vehicle, an AWD vehicle, a 3 WD vehicle, or a RWD vehicle.

Figure 4:
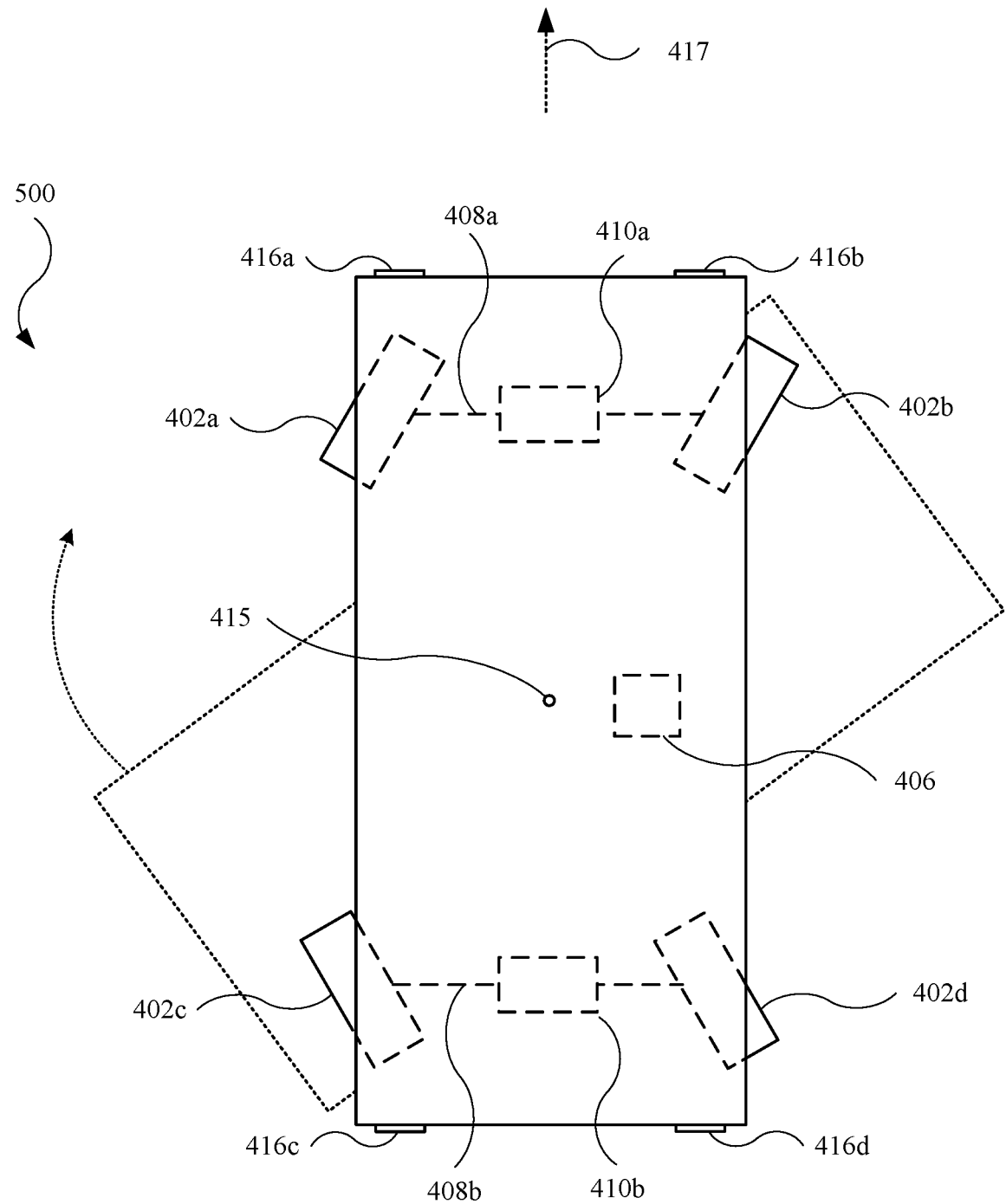
FIG. 4 illustrates an aerial view of a system maneuvering a rotation, in accordance with aspects of the present disclosure.

Referring to FIG. 4, a system 400 is shown undergoing a maneuver to rotate the system 400. As shown, the system 400 is rotating clockwise around a point 415, representing a center point of the system 400. The system 400 includes a front steering system 408a connected to a wheel 402a and a wheel 402b, as well as a rear steering system 408b connected to a wheel 402c and a wheel 402d. The system 400 further includes a front motor assembly 410a designed to provide torque to and steer the wheels 402a and 402b, as well as a rear motor assembly 410b designed to provide torque to and steer the wheels 402c and 402d. The system 400 further includes a front motor assembly 410a designed to rotate the wheels 402a and 402b, as well as a rear motor assembly 410b designed to rotate to the wheels 402c and 402d. The system 400 further includes a control system 406 designed to operate the system 400, including the aforementioned components.

In exemplary maneuver shown in FIG. 4, the control system 406 obtains vehicle data related to a detected event at the front steering system 408a, and provide various instructions. For example, the control system 406 provides steering instructions to the front steering system 408a, which includes instructions to the front motor assembly 410a to rotate the wheels 402a and 402b clockwise. Further, the control system 406 provides further steering instructions to the rear steering system 408b, which includes instructions to the rear motor assembly 410b to rotate the wheels 402c and 402d counterclockwise (i.e., a direction opposite that of the wheels 402a and 402b). The control system 406 further provides instructions to at least one of the front motor assembly 410a and rear motor assembly 410b, which includes acceleration instructions to generate torque and rotationally drive at least one of the wheels 402a, 402b, 402c, and 402d (depending on operation of the front motor assembly 410a and/or the rear motor assembly 410b) and to cause the clockwise rotation of the system 400. Prior to the described rotation, the system 400 may be moving along a direction of travel, indicated by an arrow 417. The rotation of the system 400 may be completed when the rear steering system 408b effectively becomes the front end of the system 400 and can maneuver the system 400 along the direction of travel. Although not shown in FIG. 4, the system 400 may include brakes and suspension assemblies to further assisting in maneuvering, including rotation of, the system 400. Also, it should be noted that the control system 406 is capable of rotating the system 400 in a counterclockwise manner.

Further, the system 400 may include several lights. For example, the system 400 includes a light system 416a, a light system 416b, a light system 416c, and a light system 416d. Each of the light systems 416a, 416b, 416c, and 416d may include one or more lights, including one or more incandescent bulbs or light-emitting diodes (LEDs), as non-limiting examples. In some embodiments, the light systems 416a, 416b, 416c, and 416d can illuminate in more than one color at different times. When a detected event is obtained, the control system 406 can provide instructions (e.g., illumination instructions) to one or more of the light systems 416a, 416b, 416c, and 416d to illuminate in a particular sequence provides notification to others outside the system 400 that the system 400 is not operating in a normal operating mode. Also, when the system 400 is rotated, the light systems 416c and 416d effectively transition from taillights to headlights and can illuminate in accordance with headlight functionality (e.g., illuminate the environment in front of the system 400). Conversely, when the system 400 is rotated, the light systems 416a and 416b effectively transition from headlights to taillights and can illuminate in accordance with taillight functionality (e.g., illuminate red when the brakes, not shown, are used). Although not shown, other lights may be present and dedicated to illumination when a detected event is obtained by the control system 406.

Additionally, during a detected event indicating a fault mode of the system 400, the wheels 402a and 402b may become fixed or stuck (i.e., unable to operate) at a particular angle, such as the angle shown in FIG. 4. The control system 406 may determine the respective wheel angles of the wheels 402a and 402b, and determine the selected destination based upon the wheel angles. For example, for a fixed wheel angle of, for example, 10 degrees or less, the control system 406 may compensate for the wheel angle using the brakes, steering motors, and drive motors (and suspensions assemblies, when present) to reach a number of destinations. However, for a fixed wheel angle of, for example, 30 degrees or more, the control system 406 may compensate for the wheel angle but may determine fewer destinations are possible.

Figure 5:
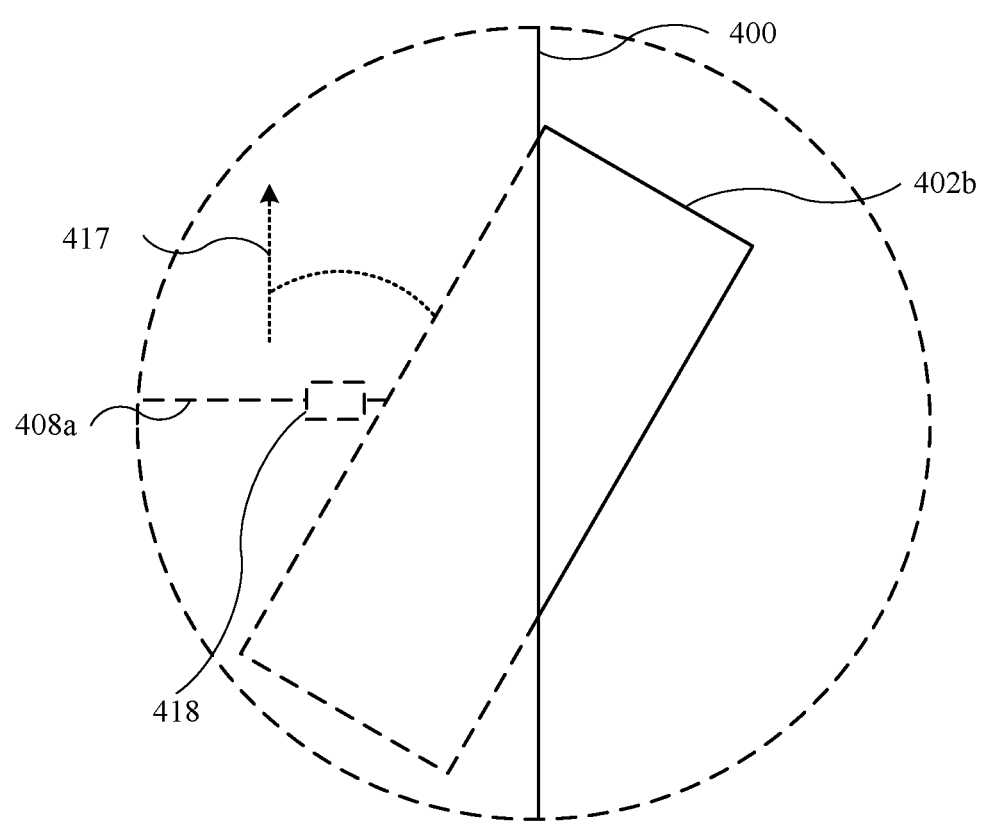
FIG. 5 illustrates an enlarged view of a system with a wheel angle sensor, in accordance with aspects of the present disclosure.

Referring to FIG. 5, an enlarged view of the system 400 in FIG. 4 shows the wheel 402b rotated relative to a direction of travel, denoted by the arrow 417. The front steering system 408a includes a wheel angle sensor 418 designed to determine an angle of the wheel 402b with respect to the direction of travel of the system 400. The wheel angle sensor 418 may include a proximity sensor or a position sensor designed to detect a position of one or more targets (not shown in FIG. 5), with each target corresponding to an angle, or range of angles, of the wheel 402b. It should be noted that the system 400 may include additional wheel angle sensors for each of the wheels of the system 400 (e.g., wheels 402a, 402c, and 402d shown in FIG. 4), and accordingly, the wheel angle of each wheel of the system 400 can be obtained by the control system 406.

Figure 6:
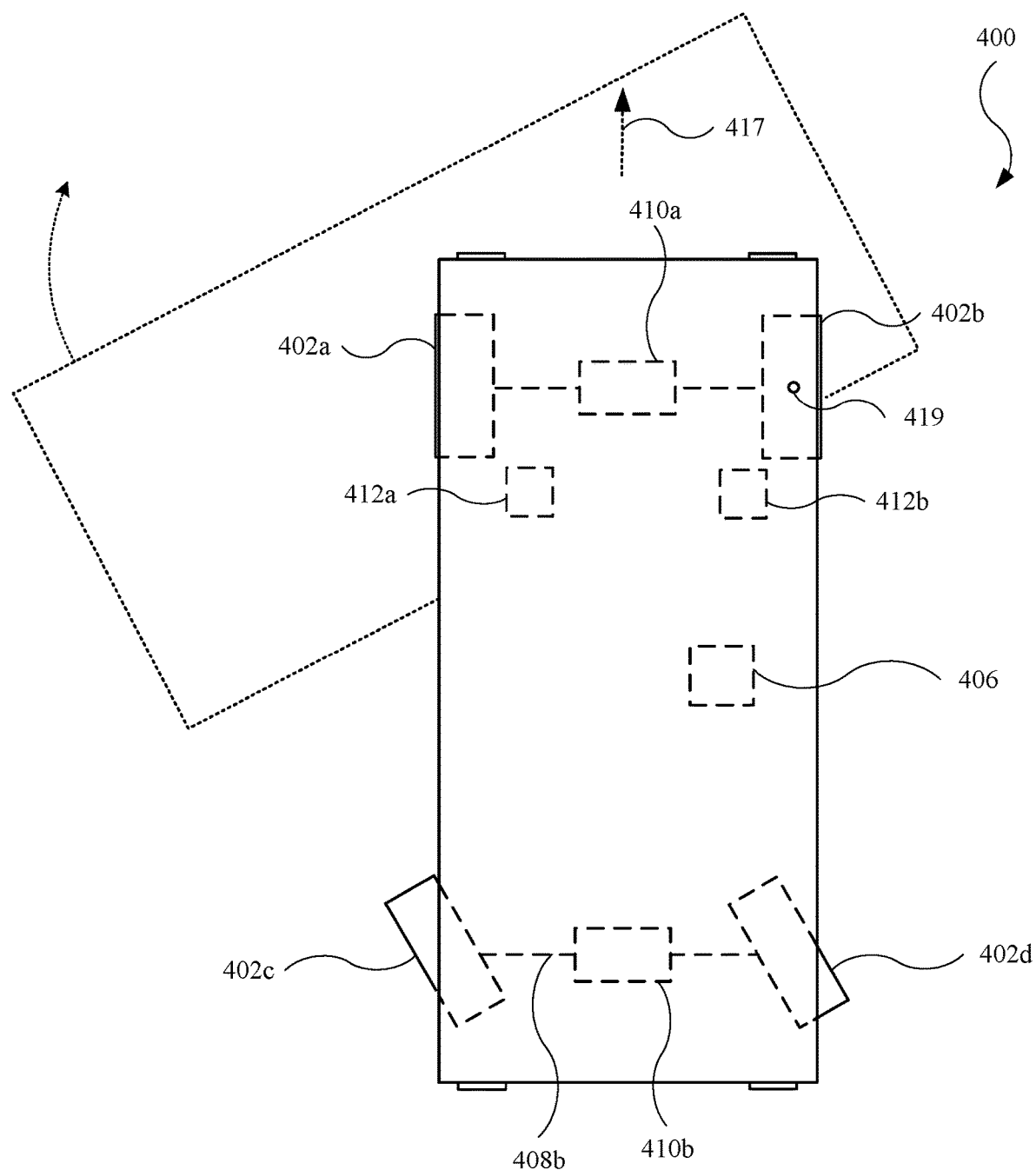
FIG. 6 illustrates an aerial view of a system maneuvering a rotation in another manner, in accordance with aspects of the present disclosure.

Referring to FIG. 6, the system 400 is rotating in an alternate manner. As shown, the system 400 includes a brake 412a and a brake 412b designed to provide a braking torque to the wheel 402a and the wheel 402b, respectively. The control system 406 can provide braking instructions to the brake 412b, while providing steering instruction to the rear motor assembly 410b, and acceleration instructions to the rear motor assembly 410b to generate torque and rotationally drive the wheels 402c and 402d. As a result, the system 400 rotates around a point 419, representing a center point of the wheel 402b. The rotation may be complete when the system 400 is rotated 180 degrees, or approximately 180 degrees, such that the rear steering system 408b can be used to maneuver the system 400. In some instances, the control system 406 also provides instructions to the front motor assembly 410a to generate torque at the wheel 402a.

Accordingly, the system 400 can rotate in various ways, as illustrated in FIGS. 4 and 6. In some instances, the control system 406 can select the manner of rotation based on factors such as efficiency (i.e., least amount of time), safety, and viability of components. Regarding viability of components, when a detected event to the front steering system 408a occurs, the control system 406 can determine, based on the detected event, which manner of rotation is more efficient and safer. In some instances, at least one manner of rotation may be eliminated based on an inoperable component (or components) of the front steering system 408a.

Figure 7:
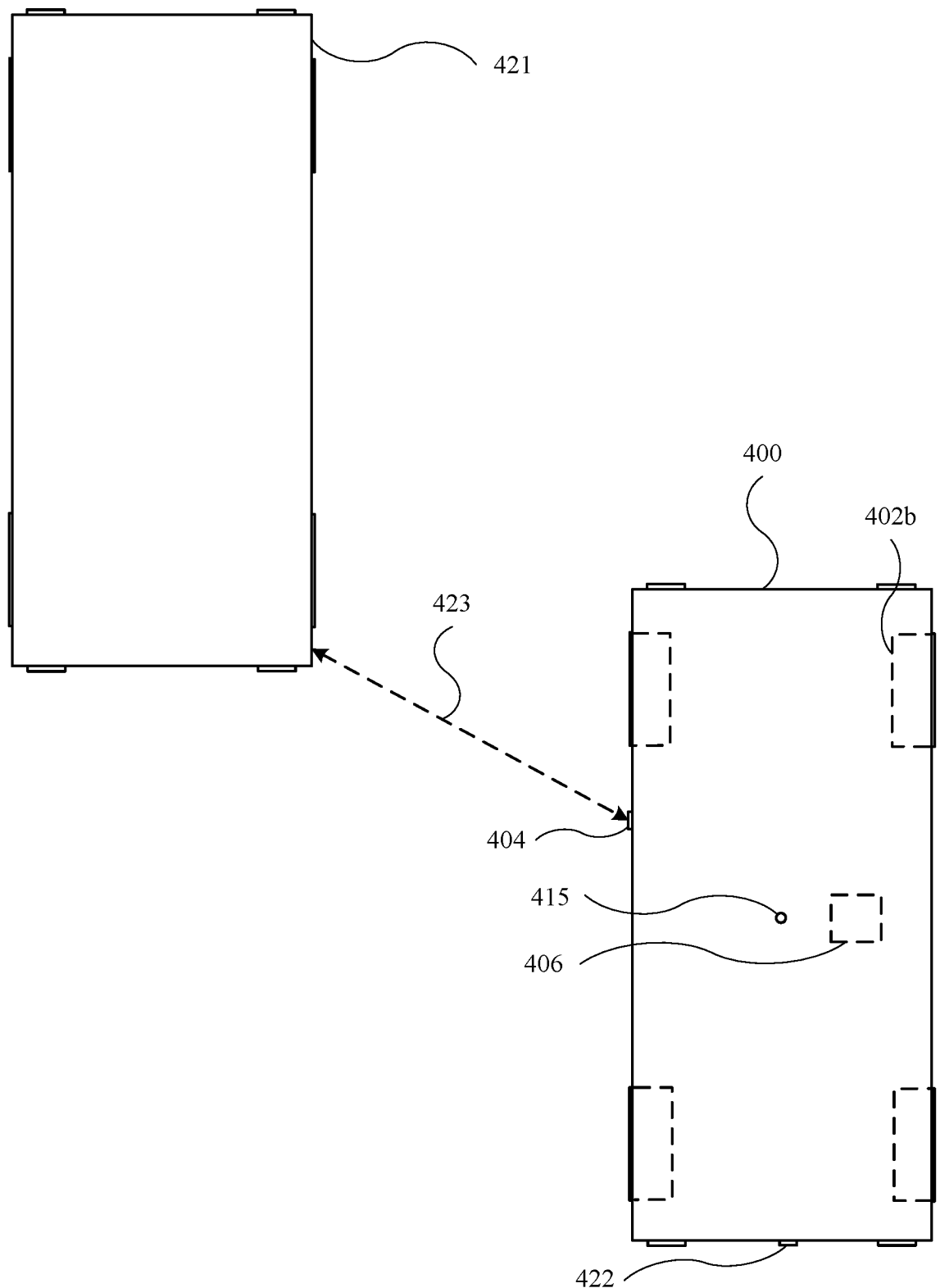
FIG. 7 illustrates an aerial view of a system using a sensing device to determine a distance from an object, in accordance with aspects of the present disclosure.

Referring to FIG. 7, the system 400 includes a sensing device 404, which may represent one or more sensing devices of a sensing system of the system 400. The sensing device 404 can determine a location of an object and an associated distance between the object and the system 400. For example, the sensing device 404 can determine a location of an object 421 and a distance 423 from the object 421 to the system 400. Based on the distance 423, the control system 406 may determine i) whether the system 400 can successfully rotate the system 400 without contacting the object 421 and ii) which of the available rotation maneuvers (e.g., shown in FIGS. 4 and 6) should be selected based on efficiency and safety. For example, in some instances, rotation around the wheel 402b may not be feasible based upon the distance 423 between the system 400 and the object 421, and rotation about the point 415 (e.g., center point) of the system 400 will avoid contact with the object 421.

In some embodiments, the sensing device 404 can determine information related to the object in terms of whether the object is a vehicle or some stationary object. The control system 406 can use the information provided by the sensing device 404 and further determine a manner to rotate the system 400. For example, when the sensing device 404 determines the object 421 is a vehicle, the control system 406 can either slow the system 400 or request updated distance information from the sensing device 404 at a later time and determine whether the distance 423 (representing an updated distance) allows for rotation of the system 400. Additionally, the system 400 may include a camera 422, representing a rear-facing camera prior to rotation of the system 400. The camera 422 may also provide object information, including distance-to-object information, and provide the information to the control system 406, and the control system 406 can use the received information as additional information to determine whether and how to maneuver a rotation of the system 400.

Figure 8:
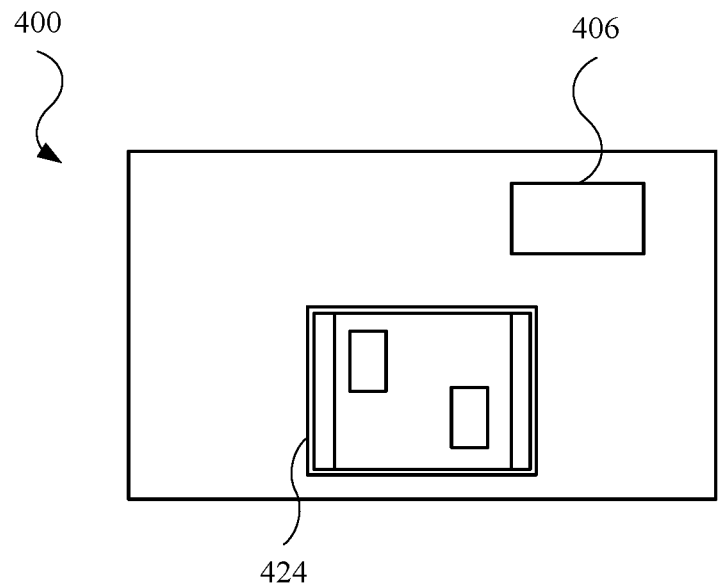
FIG. 8 illustrates an internal view of a system showing a display presenting visual information, in accordance with aspects of the present disclosure.

Referring to FIG. 8, the system 400 further includes a display 424 designed to present visual information. When the control system 406 obtains vehicle data related to a detected event and rotates the system 400, the control system 406 can further instruct the display 424 to present visual information based on video imagery, in real time or near real time, captured by the camera 422 (shown in FIG. 7). When the system 400 is rotated, passengers viewing the display 424 are effectively viewing what is going on in the "front" of the system 400. For example, as shown in FIG. 8, the display 424 shows the roadway as well as traffic on the roadway as the system 400 is driven on the roadway.

Figure 9:
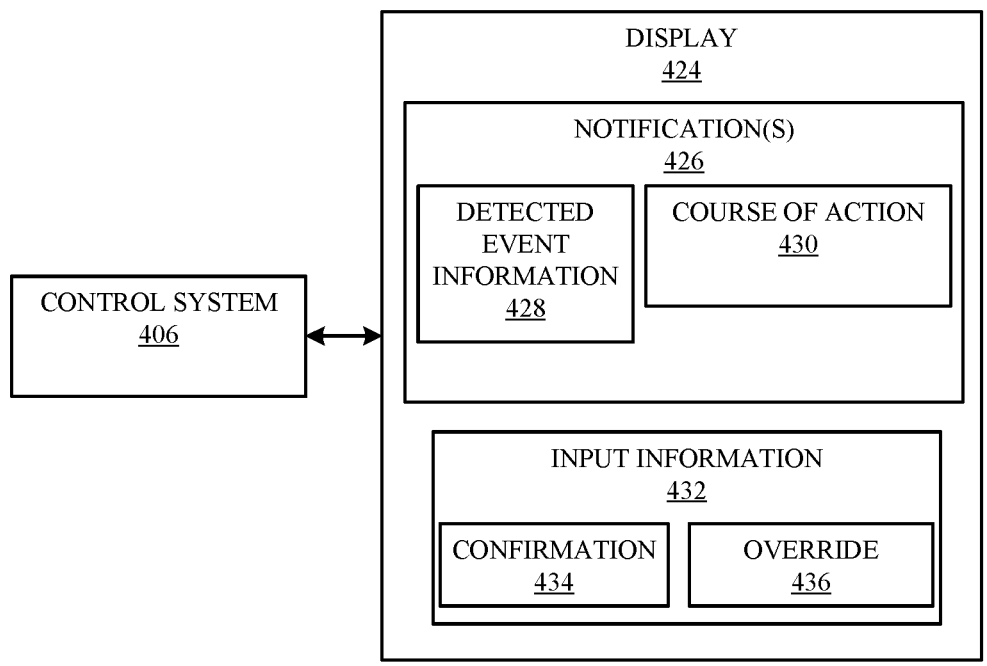
FIG. 9 illustrates a schematic view of a display of a system, in accordance with aspects of the present disclosure.

Referring to FIG. 9, the display 424 can provide additional features. For example, prior to presenting imagery in real time or near real time, the control system 406 can provide instructions to the display 424, causing the display 424 to present one or more notifications 426. The one or more notifications 426 may include detected event information 428 that includes what issue(s) to the system 400 (shown in FIG. 7) have been determined based vehicle data related to the detected event. The detected event information 428 may include information indicating the front steering system inoperable, or at least partially inoperable. The one or more notifications 426 may further include a course of action 430. For example, the course of action 430 may include stopping the system 400, maneuvering the system 400 off of the roadway, maneuvering the system 400 to an alternate destination, or an indication that the system 400 is still traveling to the originally intended destination. The course of action 430 may represent the decision made by the control system 406 in a fully autonomous vehicle.

Additionally, the display 424 may include a capacitive touch input display and offer options to the passengers. For example, the display 424 may present input information 432 such as a confirmation 434 by a passenger of the course of action 430, as well as an override 436 by the passenger. It should be noted that the input information 432 may be present in semi-autonomous vehicles and may not be available in fully autonomous vehicles.

Figure 10:
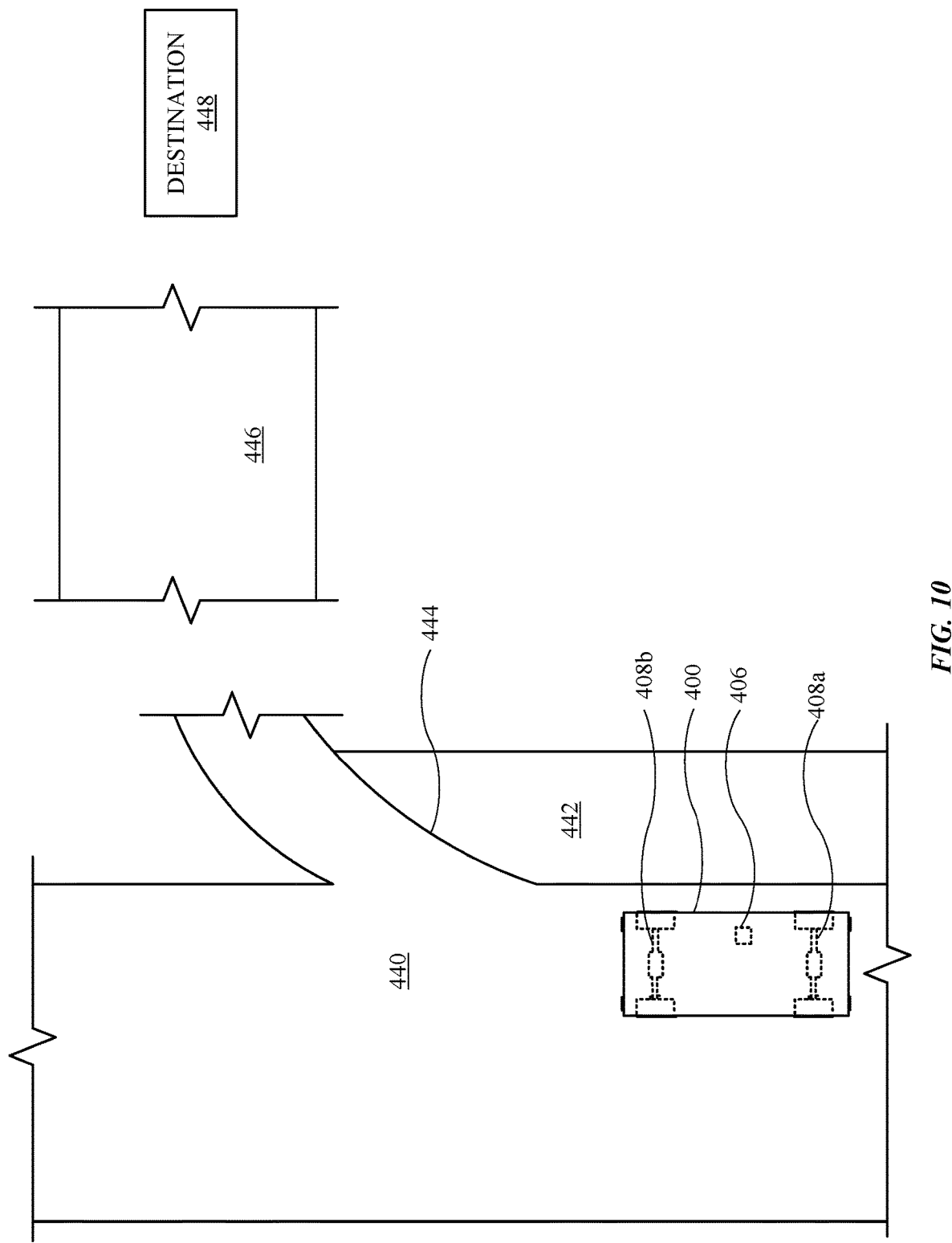
FIG. 10 illustrates an aerial view of a system and a set of exemplary destinations for the system using a rear steering system to maneuver the system to the destinations, in accordance with aspects of the present disclosure.

Referring to FIG. 10, the system 400 is rotated approximately 180 degrees based on a detected event to the front steering system 408a, and the control system 406 is using the rear steering system 408b to maneuver the system 400. As shown, the system 400 is traveling on a roadway 440. Based on the factors such as the degree of inoperability to the front steering system 408a, the control system 406 determines a location to maneuver the system 400 using the rear steering system 408b. For example, the control system 406 can provide instructions to the rear steering system 408b to stop the system 400 on the roadway 440. The control system 406 may obtain traffic information to ensure that traffic does not cause a hazardous situation to the system 400 and the passengers if stopped on the roadway 440. As another example, the control system 406 can provide instructions to the rear steering system 408b to maneuver the system 400 to a location 442 lateral to the roadway 440. The location 442 may include a shoulder. As yet another example, the control system 406 can provide instructions to the rear steering system 408b to maneuver the system 400 to an exit ramp 444, thereby removing the system 400 from the roadway 440. As another example, the control system 406 can provide instructions to the rear steering system 408b to maneuver the system 400 to a roadway 446 by way of, for example, the exit ramp 444. The traffic on the roadway 446 may include slower moving traffic than that on the roadway 440. By maneuvering the vehicle to the roadway 446, the control system 406 may determine the system 400 can continue operating and reach a destination 448. The destination 448 may be selected based upon the highest probability of success, as determined by a probability engine. In this regard, the destination 448 may include an alternate destination not originally selected by the passenger. The destination 448 may include a vehicle repair shop or a medical facility, as non-limiting examples. Further, in some instances, the control system 406 determines the system 400 can remain on the roadway 440 to reach the destination 448. The determination of the destination 448 by the control system 406 may include factors such as i) the degree of inoperability of the front steering system 408a and ii) inputs (e.g., input information 432 in FIG. 9) provided by a passenger. Alternatively, the destination 448 may include the originally intended destination when the control system 406 determines the rear steering system 408b can maneuver the system 400 to the original destination.

Figure 11:
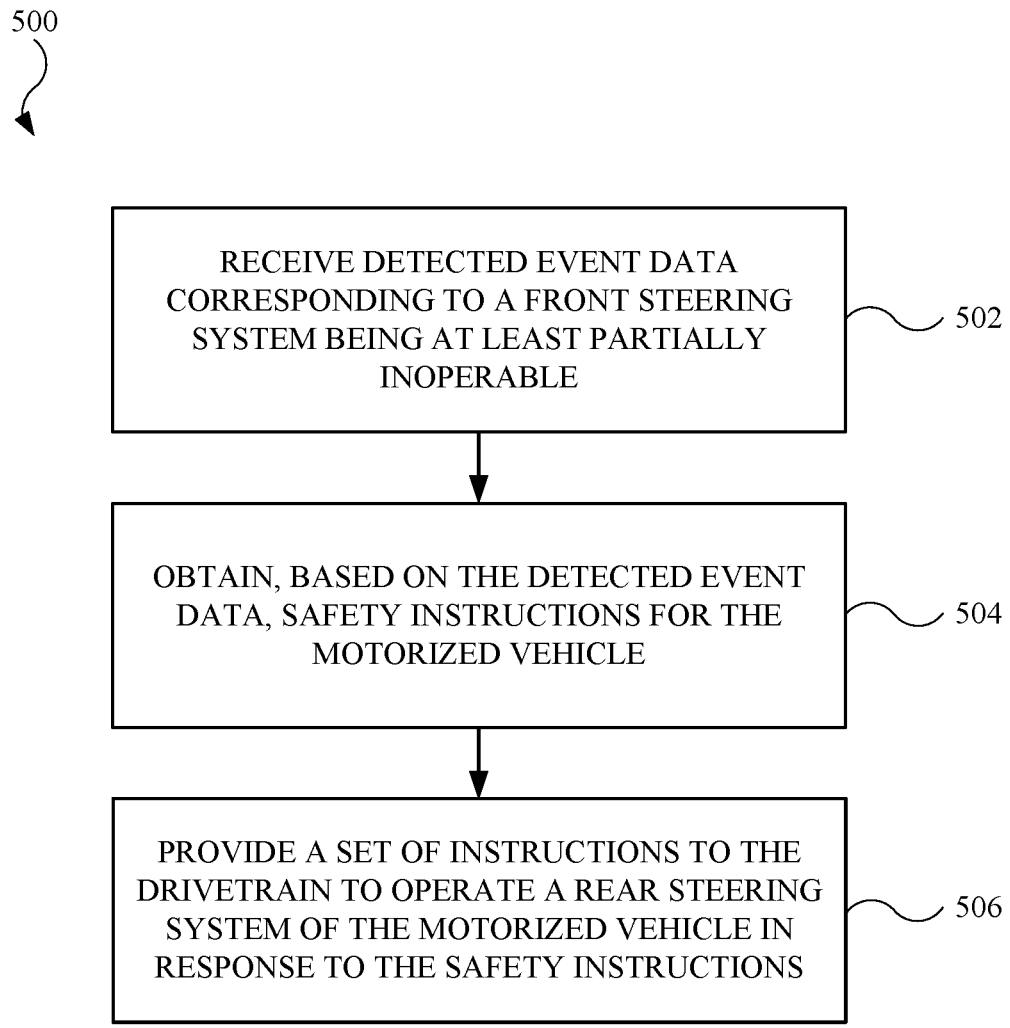
FIG. 11 illustrates a flowchart showing an operation of a system by a system control system, in accordance with aspects of the present disclosure.

Referring to FIG. 11, a flowchart 500 shows an operation of a vehicle by a vehicle control system. The vehicle control system is part of a vehicle and may include a controller capable of carrying out the steps of the flowchart 500. The controller may include control circuitry to perform the steps.

At step 502, detected event data is received. The detected event may correspond to a front steering system of the vehicle being at least partially inoperable. As non-limiting examples, a front axle or a front steering motor may be malfunctioning or damaged, as indicated by the detected event data. Alternatively, or in combination, software used to operate the front axle or the front steering motor may be malfunctioning.

At step 504, safety instructions for the motorized vehicle are obtained based on the detected event data. The safety instruction may include instructions (e.g., steering instructions) that allow the vehicle control system to maneuver the vehicle from an originally intended destination to a safe harbor location. Examples of safe harbor locations include a side of the road (e.g., shoulder) off a roadway on which the vehicle is currently located, an exit ramp to remove the vehicle from the roadway, a side street with slower-moving traffic, a vehicle repair facility, or a medical facility.

At step 506, a set of instructions is provided to the drivetrain to operate a rear steering system of the motorized vehicle in response to the safety instructions. The set of instructions may include rotating the vehicle approximately 180 degrees using the rear steering system and using the rear steering system to maneuver the vehicle to the safe harbor location.

Figure 12:
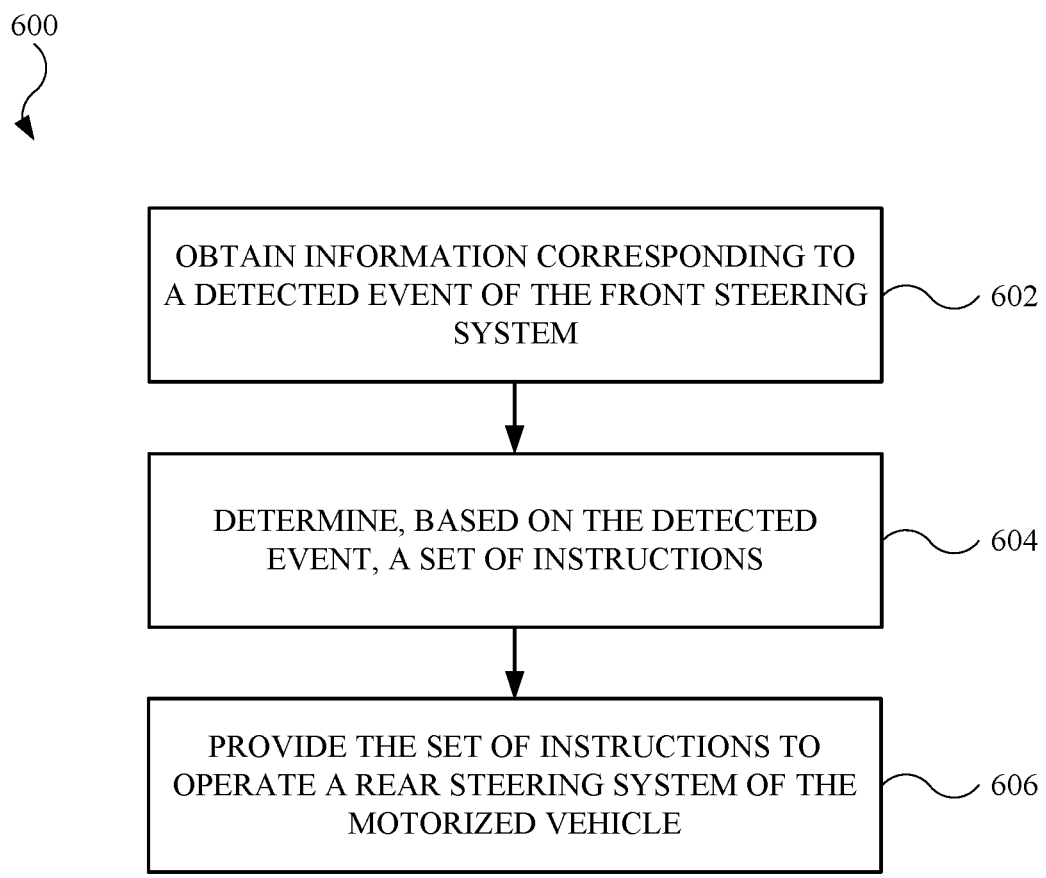
FIG. 12 illustrates a flowchart showing a method for operating a motorized system, in accordance with aspects of the present disclosure.

Referring to FIG. 12, a flowchart 600 shows a method for operating a motorized vehicle. A vehicle control system may include a controller capable of carrying out the steps of the flowchart 600. The controller may include control circuitry to perform the steps.

At step 602, information corresponding to a detected event of a front steering system is obtained. The detected event may include an indication to the vehicle control system that hardware and/or software of the front steering system is faulty, inoperable, partially inoperable, or otherwise unable to perform its intended duties.

At step 604, a set of instructions is determined based on the detected event. In this regard, the set of instruction may include steering instructions that accounts for the detected event to the front steering system, including the number of issues/faults to the front steering system, and the degree/severity of each issue/fault. The set of instructions may include steering instructions to maneuver the motorized vehicle to a location other than the initial, desired destination. The set of instructions is based part on the detected event, and accordingly, may include a destination that does not require use of the front steering system.

At step 606, the set of instructions is provided to a rear steering system of the motorized vehicle to operate the rear steering system. In some embodiments, the set of instructions disables the front steering system, rendering the front steering system inoperable. Further, the set of instructions causes the rear steering system to maneuver the motorized vehicle to a second location (e.g., safe harbor location) different from the first location. Prior to maneuvering the motorized vehicle to the second location, the set of instruction may cause the rear steering system (and in some cases, the front and rear steering systems) to rotate the motorized vehicle 180 degrees, or approximately 180 degrees.

Figure 13:
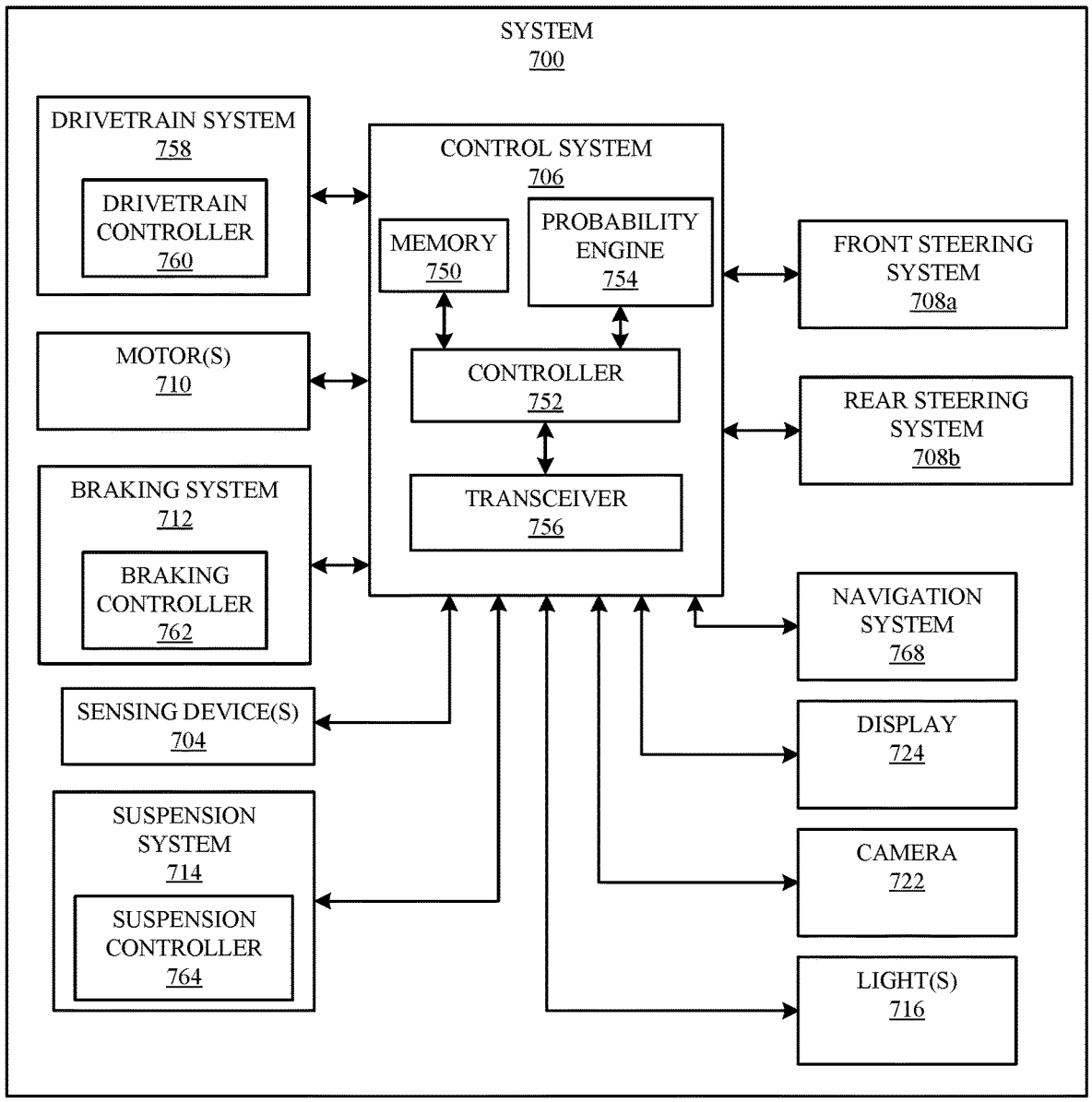
FIG. 13 illustrates a schematic view of a system, in accordance with aspects of the present disclosure.
Figure 14:
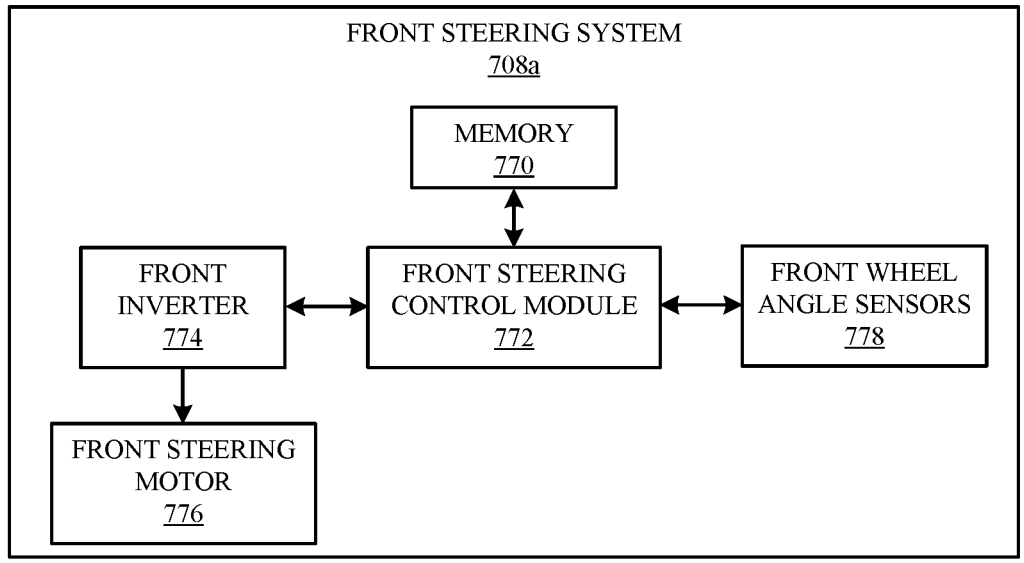
FIG. 14 illustrates a schematic view of a front steering system, in accordance with aspects of the present disclosure.
Figure 15:
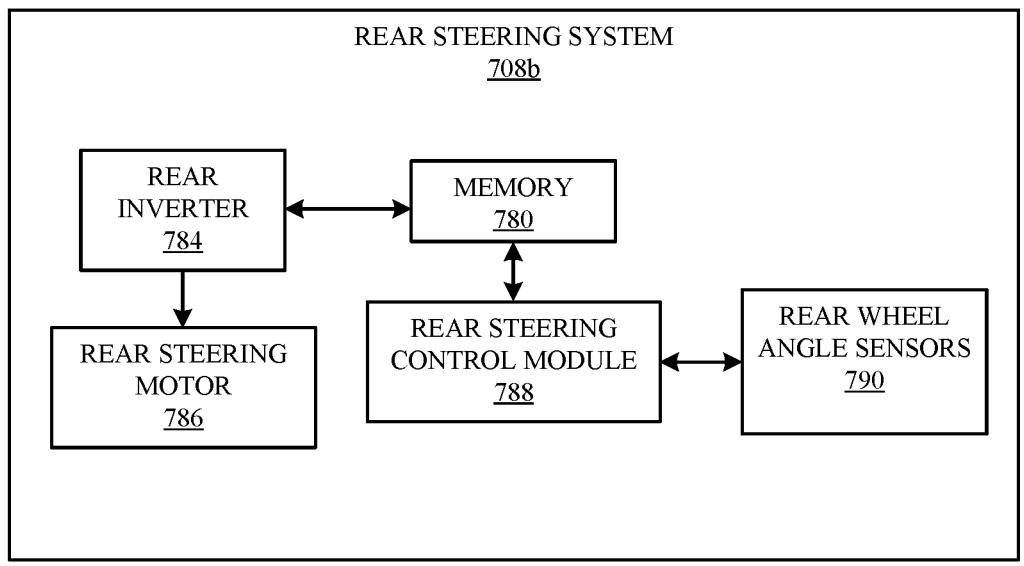
FIG. 15 illustrates a schematic view of a rear steering system, in accordance with aspects of the present disclosure.

The systems shown and described in FIGS. 13-15 may include any features previously shown and described for a system and its features. Similarly, the systems shown and described in FIG. 1-12 are capable of the providing various features shown and described in FIGS. 13-15.

Referring to FIG. 13, a diagram of a system 700, including its various components, are shown. For purposes of the following description, the system 700 will be described as a fully autonomous vehicle herein below. Accordingly, the system 700 can receive instructions (e.g., destination information, address information, etc.) and subsequently operate (e.g., drive, turn, etc.) the system 700 without human input. Also, the components and features shown and described for the system 700 may be present on any vehicle shown and/or described herein.

The system 700 includes a control system 706 designed to monitor and obtain data from various components of the system 700. The control system 706 includes a memory 750. The memory 750 includes memory circuitry that stores instructions, including executable code, for the various functions of the control system 706. The memory 750 may include read-only memory (ROM) and/or random-access memory (RAM). The control system 706 further includes a controller 752 operatively coupled to the memory 750. The controller 752 includes control circuitry (e.g., integrated circuitry or processing circuitry that includes application-specific integrated circuitry, central processing circuitry, or a combination thereof) designed to execute the instructions stored on the memory 750. The various processes, generated instructions, and generated commands discussed herein that are provided by the control system 706 may be performed and/or initiated by the controller 752.

The system 700 further includes a front steering system 708a that includes features (e.g., hardware and software) designed to control the maneuvering (e.g., steering and turning of the front wheels) of the system 700. The front steering system 708a is in communication with the control system 706, allowing the control system 706 to provide instructions (e.g., steering instructions, steering control information) to the front steering system 708a to turn the front wheels of the system 700 to maneuver the system 700 to a desired destination. Accordingly, the instructions may include turn-by-turn steering instructions to maneuver the system 700 to a desired destination.

The system 700 further includes a rear steering system 708b that includes features (e.g., hardware and software) designed to control the maneuvering of the system 700 in certain situations. Similar to the front steering system 708a, the rear steering system 708b includes features designed to control the steering and turning of the rear wheels of the system 700 in certain situations. For purposes of maneuvering the system 700 in a normal operating mode, the control system 706 can activate and use the front steering system 708a and may deactivate the rear steering system 708b such that the rear steering system 708b is not used to maneuver the system 700. However, when an event at the front steering system 708a is detected and the control system 706 obtains vehicle data related to the detected event, the control system 706 can activate the rear steering system 708b to maneuver the system 700. In some instances, activation of the rear steering system 708b by the control system 706 also causes a deactivation of the front steering system 708a, particularly when the detected event is associated with the front steering system 708a. Using the rear steering system 708b, the control system 706 can rotate the system 700 180 degrees, or approximately 180 degrees, such that the rear steering system 708b effectively becomes the "front" of the system 700 and the front steering system 708a effectively becomes the "back" of the system 700.

As non-limiting examples, a detected event (that generates a fault mode) may include information to indicate an error or malfunction to software used by the front steering system 708a. Alternatively, or in combination, a detected event may include information to indicate a malfunction and/or damage to hardware of the front steering system 708a, as determined by a sensor, or sensors, of the front steering system 708a. In order to obtain the vehicle data, the control system 706 can request status updates from the front steering system 708a to receive data indicating whether a software fault and/or hardware fault has occurred. In response to the request, the front steering system 708a provides vehicle data indicating whether there is a fault to the software and/or the hardware of the front steering system 708a. The requests may include periodic requests (e.g., in the range of several milliseconds) to the front steering system 708a to provide a status update at each request. Alternatively, the control system 706 may receive, without periodically requesting, the vehicle data relating to a fault from the front steering system 708a when the fault is detected by the front steering system 708a.

In addition to rotating the system 700, the control system 706 can use the rear steering system 708b, when activated, to maneuver the system 700 to a destination, which may include any number of locations, include safe harbor destinations for the system 700 and passengers of the system 700. As non-limiting examples, the destination may include a side (i.e., shoulder) lateral to a roadway on which the system 700 is located, an exit ramp (e.g., off ramp) from the roadway, a side street with relatively slower traffic than that of the roadway, a vehicle repair shop, or a medical facility for the passengers. In this regard, the control system 706 may further include a probability engine 754 that determines a probability of successfully maneuvering the system 700 to each possible destination based in part on factors such as the ability of the rear steering system 708b and the detected event to the front steering system 708a. For example, when the control system 706 obtains vehicle data indicating a damaged front axle of the front steering system 708a, the probability engine 754 determines the respective probability of success of the rear steering system 708b being able to maneuver the system 700 to i) the side of the road, ii) the exit ramp, iii) the side street, iv) the vehicle repair shop, and v) medical facility. The probability engine 754 selects the destination with the highest probability of success and provides the selected destination to the controller 752. The controller 752 provides the instructions to the rear steering system 708b to maneuver the vehicle to the selected destination. In another example, when the control system 706 obtains vehicle data indicating severe damage to the front steering system 708a, the probability engine 754 may determine the safest "maneuver" is to use the rear steering system 708b to stop the system 700 immediately or bring the vehicle to a gradual stop. In this regard, the control system 706 can compare each probability determined by the probability engine 754 with a threshold probability and bring the system 700 to a stop when each determined probability is below the threshold probability. In yet another example, when the control system 706 obtains a detected event, such as vehicle data indicating relatively minor fault to the front steering system 708a, the probability engine 754 may determine a relatively high probability the system 700 can reach the originally intended destination of the system 700 and use the rear steering system 708b to rotate the system 700. Then, the control system 706 can use the rear steering system 708b to maneuver the system 700 to the originally intended destination. Also, each of the front steering system 708a and the rear steering system 708b include one or more steering motors used to control the respective wheels connected to the front steering system 708a and the rear steering system 708b. This will be shown and described below.

The control system 706 further includes a transceiver 756 that includes communication circuitry designed to transmit and receive information over a network (e.g., cellular network, WIFI®, etc.). When the control system 706 obtains a detected event (e.g., vehicle data related to a fault), the control system 706 can use the transceiver 756 to provide a notification to one or more locations, with the notification including, for example, a warning of the detected event to the system 700 and/or a passenger of the system 700. For example, the transceiver 756 can transmit the notification to i) a vehicle repair facility to expect arrival of the system 700 and in some cases, to request service to the system 700 to repair the fault, ii) emergency services (e.g., a vehicle towing service, a highway patrol station, a medical facility), iii) relatives and/or friends of the passenger(s), iv) the selected destination to which the system 700 is traveling using the rear steering system 708b, and/or v) other vehicles on the same roadway as the system 700. Additionally, the transceiver 756 can receive a response based on the transmitted notification. For example, the vehicle repair facility can provide a response as to if and/or when the vehicle repair facility can repair the system 700. As another example, the vehicle towing service or the highway safety station can provide a response as to if and/or when the vehicle towing service or the highway patrol station, respectively, will provide personnel to assist the system 700. As yet another example, the selected destination can provide a response confirming it is expecting the system 700. When the transceiver 756 transmits a notification to other vehicles on the same roadway, the notification may cause the other vehicles, including their respective passengers, to take precaution. For example, the other vehicles may slow down or maneuver away from the system 700 through autonomous means or by a response from the respective drivers of the other vehicles. Further, the transceiver 214 may receive weather information for the location of the system 700, and the probability engine 754 can use the weather information as an additional factor to determine the respective probabilities of success of arriving at the destinations. Still further, the transceiver 214 may receive traffic information for the location of the system 700 and the possible destinations, and the probability engine 754 can use the traffic information as an additional factor to determine the respective probabilities of success of arriving at the destinations.

To propel the system 700 in a forward or reverse direction, the system 700 includes several additional features. For example, the system 700 further includes a drivetrain system 758 and one or more motor assemblies 710. The drivetrain system 758 includes a drivetrain controller 760, which includes control circuitry used to generate instructions to control features, such as a differential, to distribute power to a front axle connected to wheels of the front steering system 708a and a rear axle connected to wheels of the rear steering system 708b. The one or more motor assemblies 710 may include an internal combustion engine, and accordingly, the drivetrain system 758 includes a multi-speed transmission and uses energy from fuel stored in the system 700. Alternatively, the one or more motor assemblies 710 may include one or more electric motors, and accordingly, the drivetrain system 758 includes a single-speed transmission and uses energy from a battery of the system 700.

The control system 706 can provide instructions to the drivetrain system 758 and to the one or more motor assemblies 710. For example, the control system 706 can provide instructions to operate the drivetrain system 758 and the one or more motor assemblies 710 to move the vehicle in a fully autonomous manner (and in some cases, a semi-autonomous manner). Further, the control system 706 can provide instructions to the drivetrain system 758 and to the one or more motor assemblies 710 to operate (e.g., provide torque to) the wheels of the front steering system 708a and, separately, the wheels of the rear steering system 708b through, for example, respective front and rear axles. Moreover, in some embodiments, the control system 706 can provide instructions to the drivetrain system 758 and to the one or more motor assemblies 710 to individually operate each wheel of the system 700 i) in a forward or reverse motion and ii) in a steering/rotating/turning motion. As a result, the control system 706 can use the drivetrain system 758 and the one or more motor assemblies 710 in multiple ways to maneuver the front steering system 708a and the rear steering system 708b, including rotating the system 700 by individually and separately operating each wheel, if needed, when a detected event to the front steering system 708a occurs.

The system 700 further includes a braking system 712 used to provide a braking torque to the wheels connected to the front steering system 708a and to the rear steering system 708b to decelerate and/or stop the system 700. The braking system 712 includes a braking controller 762 that includes control circuitry used to generate braking instructions to the respective brakes of the system 700, with each brake designed to provide a braking torque to a wheel of the system 700. The control system 706 can provide instructions to the braking system 712, causing the braking controller 762 to generate the braking instructions to the brakes. Moreover, the braking instructions may include instructions that cause one or more brakes to individually provide a braking torque to a brake associated with a wheel. As a result, the control system 706 can use the braking system 712 in multiple ways to maneuver the front steering system 708a and the rear steering system 708b, including rotating the system 700 by generating braking instructions to provide a break torque to one or more wheels, if needed, when a detected event to the front steering system 708a occurs.

The system 700 may further include one or more sensing devices 704. The one or more sensing devices 704 may include systems such as radar, lidar, cameras, photoelectric sensors, laser sensors, or other sensing technology that provides the system 700 with information related to the roadway on which the system 700 is located. For example, the one or more sensing devices 704 can determine information such as where the system 700 is relative to the roadway (e.g., within a particular lane) or to other objects or obstacles on the roadway (e.g., other vehicles).

The control system 706 can obtain the information (e.g., sensor data) from the one or more sensing devices 704 to determine whether the system 700 has sufficient clearance to rotate the system 700 when a detected event occurs. For example, when an object is within proximity to the system 700, the control system 706 uses the information from the one or more sensing device 704 to determine whether the object is at least a threshold distance away from the system 700 such that the vehicle, when rotated, will not contact the object. The control system 706 may use additional factors, such as the dimensions of the system 700, the method of rotating the system 700 (e.g., rotating around a front wheel or around a center of the system 700), and whether the detected vehicle is or has moved away from the system 700.

Additionally, the one or more sensing devices 704 may include system sensors, fault detection sensors, fault monitors, sensors, or the like. Accordingly, in some embodiments, the one or more sensing devices 704 include proximity sensors, temperature sensors, or temperature sensors. The one or more sensing devices 704 may be positioned on or near the front steering system 708a to monitor a component of the front steering system 708a and may provide vehicle data to the control system 706 indicating the monitored component is operating under a normal operating mode or under a fault mode.

The system 700 may further include a suspension system 714. The suspension system 714 may include an electronic suspension system that includes a suspension controller 764 that includes control circuitry designed to generate suspension adjustment instructions to adjust hardware (e.g., shocks and struts), thus adjusting ride characteristics of the system 700. The control system 706 can provide instructions to the suspension system 714 to apply more less force on a particular wheel, or wheels, of the system 700. As a result, the control system 706 can manipulate certain features of the system 700 to facilitate rotation when a detected event occurs or compensate for malfunctioning features of the front steering system 708a.

The system 700 may further include a navigation system 768 designed to communicate and receive location information (e.g., roadway data) from multiple navigation satellites circling the Earth. Accordingly, the navigation system 768 may include a global positioning system (GPS) that provides location information of the system 700. When the control system 706 obtains vehicle data related to a detected event, the control system 706 can communicate with the navigation system 768 to determine location information of one or more possible destinations. For example, the navigation system 768 can provide the control system 706 with respective distance information from the system 700 to one or more possible destinations, and the probability engine 754 can determine, based in part on the respective distance information, the probability of successfully using the rear steering system 708b to get the system 700 to each of the one or more destinations, and provide the control system 706 with the destination of highest probability of success. Accordingly, the control system 706 can use the information provided by the navigation system 768 to select the destination.

The system 700 may further include a display 724 that provides visual information (e.g., display data). The display 724 may include a capacitive touch-input display designed to receive an input and/or a gesture from a passenger of the system 700. The control system 706 can provide the display 724 with information related to the detected event, and the display 724 can present visual information (e.g., textual information, still image(s) and/or video image(s)) related to the detected event. Additionally, the control system 706 can provide information the display 724 related to i) a notification that the system 700 may rotate and use the rear steering system 708b, ii) the selected destination to which the system 700 will travel using the rear steering system 708b, and/or iii) an option for the passenger to override the selected destination. When passenger input to the display 724 is available, the passenger may indicate by pressing an option presented on the display 724 that provides a response as to whether a medical facility for one or more passengers is necessary, and the probability engine 754 may use the response to determine whether to provide probability of success information to the medical facility.

Additionally, the system 700 may include a camera 722, including a rear-facing camera that captures imagery behind the system 700 during a normal operation mode. When the system 700 is rotated based on an obtained detected event by the control system 706, and the rear steering system 708b is maneuvering the system 700 to the selected destination, the camera 722 effectively becomes a "front-facing camera." The control system 706 can instruct the camera 722 to capture a live feed (e.g., real time or near real time imagery) and provide the display 724 with display data corresponding to the live feed, thus allowing the display 724 to present the live feed as visual information. Accordingly, the passengers can view the display 724 to see where the system 700 is currently traveling. Also, in some embodiments, the camera 722 may be used to determine an onset of an accident (e.g., collision with another vehicle) to the system 700. In this regard, the control system 706 can obtain data from the camera 722, and a detected event may include the onset of an accident. Accordingly, the controller 752 can generate instructions to attempt to minimize the impact of the accident or avoid the accident. For example, the controller 752 can send braking instructions to the braking system 712 to brake the wheels connected to the front steering system 708a and the rear steering system 708b, and/or turn the aforementioned wheels to change the direction of the system 700.

Additionally, the system 700 may include one or more lights 716. The one or more lights 716 may include headlights, taillights, and blinking lights, as non-limiting examples. The control system 706 can provide instructions (e.g., illumination instructions) to the one or more lights 716, causing the one or more lights 716 to flash or blink in a manner indicating a detected event to the system 700 has occurred. Further, when the system 700 is rotated and operated by the rear steering system 708b, the control system 706 can illuminate and effectively use the taillights of the one or more lights 716 as "headlights" to enhance vision of the passengers in the system 700 and/or to provide awareness to other vehicles, including their respective passengers. Moreover, the control system 706 can illuminate and effectively use the headlights as "braking lights" to provide an indication of braking to other vehicles.

Beneficially, with the ability to individually and separably provide torque (for forward motion) and braking torque to each wheel of the system 700, the control system 706 includes several degrees of freedom to maneuver the system 700, including rotation of the system 700 and getting the vehicle to a safe destination. Also, the control system 706 represents a central hub of the system 700 that can communicate and instruct the various features of the system 700 shown and described in FIG. 13.

Referring to FIG. 14, the front steering system 708a includes several features for maneuvering the system 700 shown in FIG. 13. For example, the front steering system 708a includes a memory 770. The memory 770 includes memory circuitry that stores instructions, including executable code, for the various functions of the front steering system 708a. The front steering system 708a further includes a front steering control module 772 operatively coupled to the memory 770. The front steering control module 772 includes control circuitry (e.g., integrated circuitry or processing circuitry including application-specific integrated circuitry, central processing circuitry, or a combination thereof) designed to execute the instructions stored on the memory 770 in order to operate various features of the front steering system 708a shown and described in FIG. 14.

The front steering system 708a further includes a front inverter 774 and a front steering motor 776. The front steering motor 776 may be incorporated into the one or more motor assemblies 710 (shown in FIG. 13). The front steering motor 776 is designed to actuate steering hardware connected to a pair of wheels (i.e., a front set of wheels), and thus maneuver the system 700 by rotating, or turning, the front set of wheels. To control the front steering motor 776, the front inverter 774 (e.g., DC to AC module) is designed to regulate electrical energy provided to the front steering motor 776. In fully autonomous and semi-autonomous vehicles, the front steering control module 772 can provide instructions (e.g., steering instructions) to the front inverter 774 to increase or decrease the supply of electrical energy to the front steering motor 776.

The front steering system 708a further includes front wheel angle sensors 778 designed to determine a current angle of the wheels connected to the front steering system 708a. As an example, the front wheel angle sensors 778 may include proximity sensors designed to detect one or more targets at predetermined locations, with each target representing a specific angle or range of angles. Alternatively, the front wheel angle sensors 778 may include position sensors that determine a position of a moveable component (e.g., steering arm, actuator) connected to the wheels, with the position corresponding to an angle of the wheels. As a result, the front wheel angle sensors 778 can determine an angle of the wheels with respect to a direction of travel or with respect to a current position of the system 700. The front wheel angle sensors 778 can provide feedback (e.g., wheel angle data) to the front steering control module 772.

Referring to FIG. 15, the rear steering system 708b may include several features similar to those of the front steering system 708a, and accordingly, the rear steering system 708b includes several features for maneuvering the system 700 shown in FIG. 13. For example, the rear steering system 708b includes a memory 780. The memory 780 includes memory circuitry that stores instructions, including executable code, for the various functions of the rear steering system 708b. The rear steering system 708b further includes a rear steering control module 788 operatively coupled to the memory 780. The rear steering control module 788 includes control circuitry (e.g., integrated circuitry or processing circuitry including application-specific integrated circuitry, central processing circuitry, or a combination thereof) designed to execute the instructions stored on the memory 780 in order to operate various features shown and described in FIG. 15.

The rear steering system 708b further includes a rear inverter 784 and a rear steering motor 786. The rear steering motor 786 may be incorporated into the one or more motor assemblies 710 (shown in FIG. 13). The rear steering motor 786 is designed to actuate steering hardware connected to a pair of wheels (i.e., a rear set of wheels), and thus maneuver the system 700 by rotating/turning the rear set of wheels. To control the rear steering motor 786, the rear inverter 784 (e.g., DC to AC module) is designed to regulate electrical energy provided to the rear steering motor 786. In fully autonomous and semi-autonomous vehicles, the rear steering control module 788 can provide instructions (e.g., steering instructions) to the rear inverter 784 to increase or decrease the supply of electrical energy to the rear steering motor 786.

The rear steering system 708b further includes rear wheel angle sensors 790 designed to determine the angle of the wheels connected to the rear steering system 708b. The rear wheel angle sensors 790 may include any device used for the front wheel angle sensors 778 shown and described in FIG. 14. Accordingly, the rear wheel angle sensors 790 can determine an angle of the wheels with respect to a direction of travel or with respect to a current position of the system 700. The rear wheel angle sensors 790 can provide feedback (e.g., wheel angle data) to the rear steering control module 788.

Referring to FIGS. 14 and 15, in an exemplary implementation, the front steering system 708a can be used to maneuver the system 700 while the rear steering system 708b is inactive. However, when the control system 706 (shown in FIG. 13) obtains vehicle data related to a detected event (e.g., fault), the control system 706 can activate the rear steering system 708b to maneuver the system 700 and, optionally, the control system 706 can deactivate the front steering system 708a. In addition to the rear steering system 708b, the control system 706 can use other features, including the drivetrain system 758 and/or the braking system 712 (both shown in FIG. 13) to maneuver the system 700 when an event is detected. Other implementations are possible. For example, the control system 706 can simultaneously use the front steering system 708a and the rear steering system 708b to maneuver the system 700 and when a fault occurs, only the rear steering system 708b is used to maneuver the system 700 and the front steering system 708a is deactivated. In yet another example, the control system 706 can use the rear steering system 708b is used to maneuver the system 700 when an event is detected, while also using operable features of the front steering system 708a (i.e., those not associated with the detected event) remain available for maneuvering the system 700.

Beneficially, by providing separate front and rear steering capabilities, the system 700 may include fault tolerant capabilities as the rear steering system 708b includes maneuvering and driving capabilities in the event of a failure to the front steering system 708a. Further, the front steering system 708a and the rear steering system 708b may each include a single inverter and steering motor, as opposed to traditional vehicles with redundant inverters and controllers used to control complex components, such as a dual wound motor. Moreover, using the front steering system 708a and the rear steering system 708b in a manner described herein may reduce components such as motors and associated electronic control units used to control the motors.

Various examples of aspects of the disclosure are described below as clauses for convenience. These are provided as examples, and do not limit the subject technology.

Clause A: a system, including: a front steering system configured to maneuver the system; a rear steering system; and a controller operatively coupled to the front steering system and the rear steering system, the controller configured to: receive vehicle data relating to the front steering system; determine, based on the vehicle data, steering control information; and provide instructions, based on the steering control information, to disable the front steering system and to operate the rear steering system independently from the front steering system.

Clause B: a vehicle control system for a motorized vehicle, the vehicle control system including: a controller configured to: provide a first set of instructions to a drivetrain system to operate a front steering system of the motorized vehicle; receive detected event data corresponding to the front steering system being at least partially inoperable; obtain, based on the detected event data, safety instructions for the motorized vehicle; and provide a second set of instructions to the drivetrain system to operate a rear steering system of the motorized vehicle in response to the safety instructions.

Clause C: A method for operating a motorized vehicle, the method including: obtaining information corresponding to a detected event of a front steering system of the motorized vehicle; determining, based on the detected event, a set of instructions; and providing the set of instructions to operate a rear steering system of the motorized vehicle, wherein the set of instructions disables the front steering system and causes the rear steering system to maneuver the motorized vehicle.

One or more of the above clauses can include one or more of the features described below. It is noted that any of the following clauses may be combined in any combination with each other, and placed into a respective independent clause, e.g., clause A, B, or C.

Clause 1: wherein the controller is further configured to: prior to receipt of the vehicle data, autonomously operate the front steering system and the rear steering system to maneuver the system to a first location; and responsive to receipt of the vehicle data, autonomously operate the rear steering system and maneuver the system to a second location different from the first location.

Clause 2: wherein: the vehicle data includes a fault with the front steering system, and the controller is further configured to disable the front steering system based on the fault.

Clause 3: wherein the controller is further configured to: obtain a wheel angle of a first wheel coupled to the front steering system, the wheel angle including an angle between the first wheel and a direction of travel of the system, wherein: the vehicle data is based on the wheel angle, and the instructions operate a second wheel coupled to the rear steering system.

Clause 4: wherein the instructions to the rear steering system cause the second wheel to rotate such that the system exits a roadway on which the first wheel and the second wheel are located.

Clause 5: wherein the instructions to the rear steering system cause the second wheel to maintain the direction of travel of the system.

Clause 6: wherein the instructions cause the rear steering system to rotate the system 180 degrees and continue movement of the system along the direction of travel.

Clause 7: wherein the controller is further configured to: obtain sensor data from a sensing device coupled to the system; determine, based on the sensor data, a distance between an object and the system; and when the distance is greater than a threshold distance, provide the instructions to the rear steering system to rotate the system.

Clause 8: wherein the controller is further configured to provide the instructions to: operate a brake configured to provide a braking torque to a first wheel coupled to the front steering system; and while the braking torque is applied to the first wheel, operate a motor configured to provide a torque to rotationally drive a second wheel coupled to the rear steering system.

Clause 9: wherein the controller is further configured to provide the instructions to: operate a first motor configured to rotationally drive a first set of wheels coupled to the front steering system; and operate a second motor configured to rotationally drive a second set of wheels coupled to the rear steering system, wherein the controller is configured independently control the first motor and the second motor to maneuver the system based on the steering control information.

Clause 10: wherein the controller is further configured to provide display data to a display carried by the system, the display data causing the display to present visual information indicating the front steering system is at least partially inoperable.

Clause 11: wherein the safety instructions include steering instructions to a destination.

Clause 12: wherein the second set of instructions causes at least the rear steering system to maneuver a 180-degree turn of the motorized vehicle and continue operating the motorized vehicle to the destination.

Clause 13: wherein the controller is further configured to obtain roadway data corresponding to a roadway on which the motorized vehicle is located, and wherein the destination includes a location other than the roadway.

Clause 14: wherein the destination is selected from one of: a second roadway different from the roadway, a ramp connected to the roadway, a shoulder lateral to the roadway, and a vehicle repair facility for the motorized vehicle.

Clause 15: wherein providing the set of instructions includes autonomously operating the rear steering system to rotate the motorized vehicle 180 degrees and continue moving the motorized vehicle to a selected destination based on the set of instructions.

Clause 16: wherein the set of instructions further includes: operating a first wheel of the front steering system at a first speed; and operating a second wheel of the rear steering system at a second speed different from the first speed.

Clause 17: wherein the set of instructions further includes: operating a brake to provide a braking torque to a first wheel of the front steering system; and operating a motor to provide a torque to a second wheel of the rear steering system.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system, comprising:
   a first steering system configured to maneuver the system;
   a second steering system; and
   a controller operatively coupled to the first steering system and the second steering system, the controller configured to:
   receive data relating to the first steering system and a direction of travel;
   determine, based on the data, steering control information;
   provide instructions, based on the steering control information, to disable the first steering system and to operate the second steering system independently from the first steering system; and
   use the second steering system to rotate the system 180 degrees and continue movement of the system along the direction of travel.

2. The system of claim 1, wherein the controller is further configured to:
   prior to receipt of the data, autonomously operate the first steering system and the second steering system to maneuver the system to a first location; and
   responsive to receipt of the data, autonomously operate the second steering system and maneuver the system to a second location different from the first location.

3. The system of claim 1, wherein:
   the data comprises a fault with the first steering system, and
   the controller is further configured to disable the first steering system based on the fault.

4. The system of claim 1, wherein the controller is further configured to:
   obtain a wheel angle of a first wheel coupled to the first steering system, the wheel angle comprising an angle between the first wheel and a direction of travel of the system, wherein:
   the data is based on the wheel angle, and
   the instructions operate a second wheel coupled to the second steering system.

5. The system of claim 4, wherein the instructions to the second steering system cause the second wheel to rotate such that the system exits a roadway on which the first wheel and the second wheel are located.

6. The system of claim 4, wherein the instructions to the second steering system cause the second wheel to maintain the direction of travel of the system.

7. The system of claim 1, wherein the controller is further configured to:
   obtain sensor data from a sensing device coupled to the system;
   determine, based on the sensor data, a distance between an object and the system; and
   when the distance is greater than a threshold distance, provide the instructions to the second steering system to rotate the system.

8. The system of claim 1, wherein the controller is further configured to provide the instructions to:
   operate a brake configured to provide a braking torque to a first wheel coupled to the first steering system; and
   while the braking torque is applied to the first wheel, operate a motor configured to provide a torque to rotationally drive a second wheel coupled to the second steering system.

9. The system of claim 1, wherein the controller is further configured to provide the instructions to:

obtain, from a probability engine and based on the data, i) a first probability of the system reaching a first destination and ii) a second probability of the system reaching a second destination different from the first destination; and provide additional instructions to the second steering system of the system to maneuver the system to one of the first destination or the second destination that is associated with a highest probability.

10. The system of claim 1, wherein the controller is further configured to:

obtain a user-based input to maneuver to a first destination;

obtain, from a probability engine and based on the data, i) a first probability of the system reaching the first destination and ii) a second probability of the system reaching a second destination different from the first destination;

determine whether the first probability is below a threshold probability and greater than the second probability; and in response to the first probability being below the threshold probability and greater than the second probability, maneuver to the first destination.

11. The system of claim 1, wherein the controller is further configured to:

receive second data corresponding to the first steering system being at least partially inoperable;

obtain, based on the second data, second steering control information; and operate, based on the second steering control information, the second steering system.

12. The system of claim 11, wherein the second steering control information comprise steering instructions to a safe harbor location.

13. The system of claim 12, wherein the controller is further configured to obtain roadway data corresponding to a roadway on which the system is located, and wherein the safe harbor location comprises a location other than the roadway.

14. The system of claim 13, wherein the safe harbor location is selected from one of:

a second roadway different from the roadway,
a ramp connected to the roadway,
a shoulder lateral to the roadway, and
a repair facility for the system.

15. A method for operating a motorized system, the method comprising:

obtaining information corresponding to a detected event of a first steering system of the motorized system;

determining, based on the detected event, a set of instructions;

providing the set of instructions to operate a second steering system of the motorized system, wherein the set of instructions disables the first steering system and causes the second steering system to maneuver the motorized system; and autonomously operating, based on the set of instructions, the second steering system to rotate the motorized system 180 degrees and continue moving the motorized system to a selected destination based on the set of instructions.

16. The method of claim 15, wherein the set of instructions further comprises:

operating a first wheel of the first steering system at a first speed; and operating a second wheel of the second steering system at a second speed different from the first speed.

17. The method of claim 15, wherein the set of instructions further comprises:

obtaining, from a probability engine and based on the information, i) a first probability of the system reaching a first destination and ii) a second probability of the system reaching a second destination different from the first destination; and providing additional instructions to the second steering system of the system to maneuver the system to one of the first destination or the second destination that is associated with a highest probability.

18. A non-transitory computer-readable medium, comprising:

computer-readable instructions that, when executed by a processor, cause the processor to perform one or more operations comprising:

obtaining information corresponding to a detected event of a first steering system of a motorized system;

determining, based on the detected event, a set of instructions;

providing the set of instructions to operate a second steering system of the motorized system, wherein the set of instructions disables the first steering system and causes the second steering system to maneuver the motorized system; and operating the second steering system to rotate the motorized system 180 degrees and continue moving the motorized system to a selected destination based on the set of instructions.

19. The non-transitory computer-readable medium of claim 18, wherein the one or more operations further comprises:

operating a first wheel of the first steering system at a first speed; and operating a second wheel of the second steering system at a second speed different from the first speed.

20. The non-transitory computer-readable medium of claim 18, wherein the one or more operations further comprises:

operating a brake to provide a braking torque to a first wheel of the first steering system; and operating a motor to provide a torque to a second wheel of the second steering system.

* * * * *